(12) United States Patent
Karpenko

(10) Patent No.: US 10,107,346 B2
(45) Date of Patent: Oct. 23, 2018

(54) DRY FRICTION DAMPED METALLIC MATERIAL AND METHODS OF MANUFACTURING AND USING SAME

(71) Applicant: Ford Global Technologies, LLC, Dearborn, MI (US)

(72) Inventor: Yuri Anatoly Karpenko, Brighton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/343,505

(22) Filed: Nov. 4, 2016

(65) Prior Publication Data

US 2018/0128337 A1    May 10, 2018

(51) Int. Cl.
| | | |
|---|---|---|
| *F16F 7/08* | (2006.01) | |
| *F16F 15/02* | (2006.01) | |
| *B23P 19/04* | (2006.01) | |
| *B62D 25/08* | (2006.01) | |

(52) U.S. Cl.
CPC ............... *F16F 7/08* (2013.01); *B23P 19/04* (2013.01); *F16F 15/02* (2013.01); *B62D 25/088* (2013.01)

(58) Field of Classification Search
CPC .............. F16F 7/08; F16F 15/02; B23P 19/04
See application file for complete search history.

(56) References Cited

U.S. PATENT DOCUMENTS

| | | | |
|---|---|---|---|
| 2,290,554 A  * | 7/1942 | Hack | C22C 47/066 228/136 |
| 4,203,195 A | 5/1980 | Nakao et al. | |
| 9,133,534 B2 | 9/2015 | Mitchick et al. | |
| 2004/0136559 A1* | 7/2004 | Suzuki | H01F 7/066 381/400 |
| 2007/0283677 A1* | 12/2007 | Ohara | D02G 3/12 57/210 |
| 2009/0226691 A1* | 9/2009 | Mankame | D07B 1/0673 428/222 |

\* cited by examiner

*Primary Examiner* — Vishal R Sahni
(74) *Attorney, Agent, or Firm* — LeClairRyan

(57) ABSTRACT

A method and system for improving the vibration damping properties in a metal product are disclosed. The product incorporates a dry friction, layered metallic damping material having embedded therein one or more woven mesh layers comprised of wire ropes of bundled wires. The ropes may be sheathed with a thin layer of metal. The individual ropes are woven to form the mesh layer with some ropes being positioned in a first or Y direction and the other ropes being positioned in a second or X direction. One or more mesh layers are attached to a metal substrate by rolling, forming or extrusion. The parameters of the rolling, forming or extruding process can be optimized to achieve the proper embedding of the ropes into the metal plate where the ropes are locked into the metal plate with the metal material flowing over the cable outer surfaces without infiltrating between the wires.

18 Claims, 15 Drawing Sheets

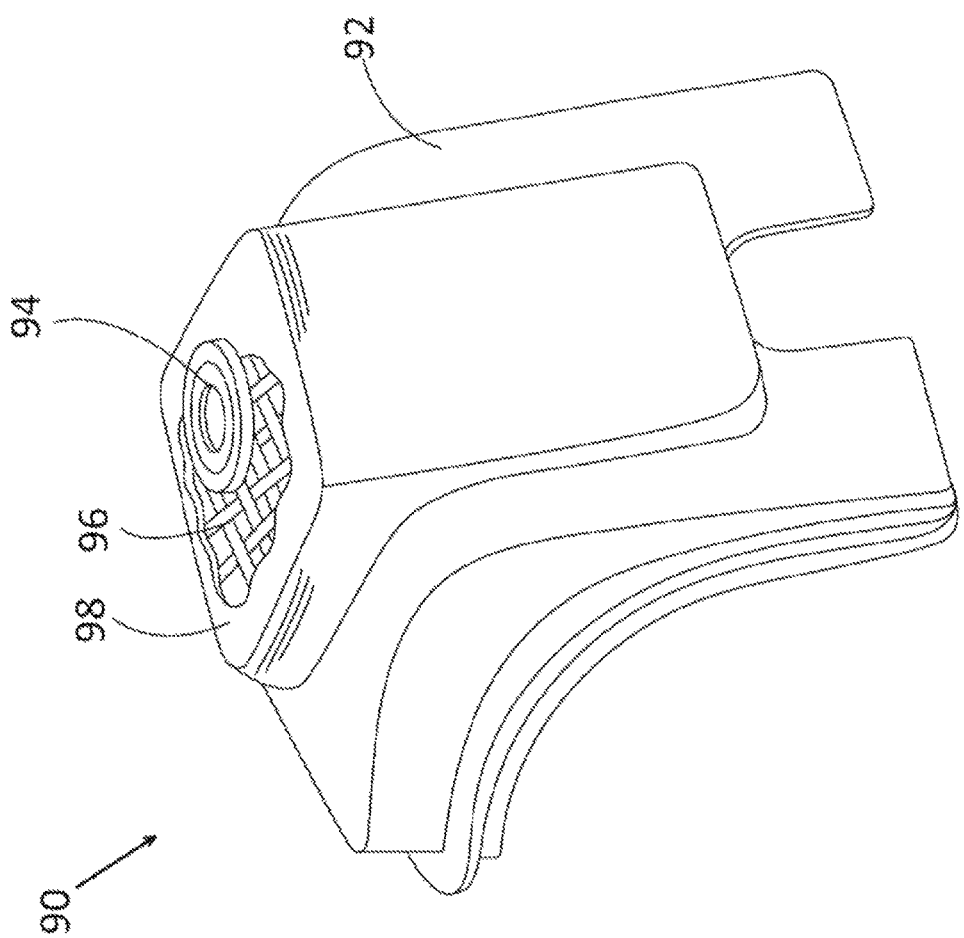

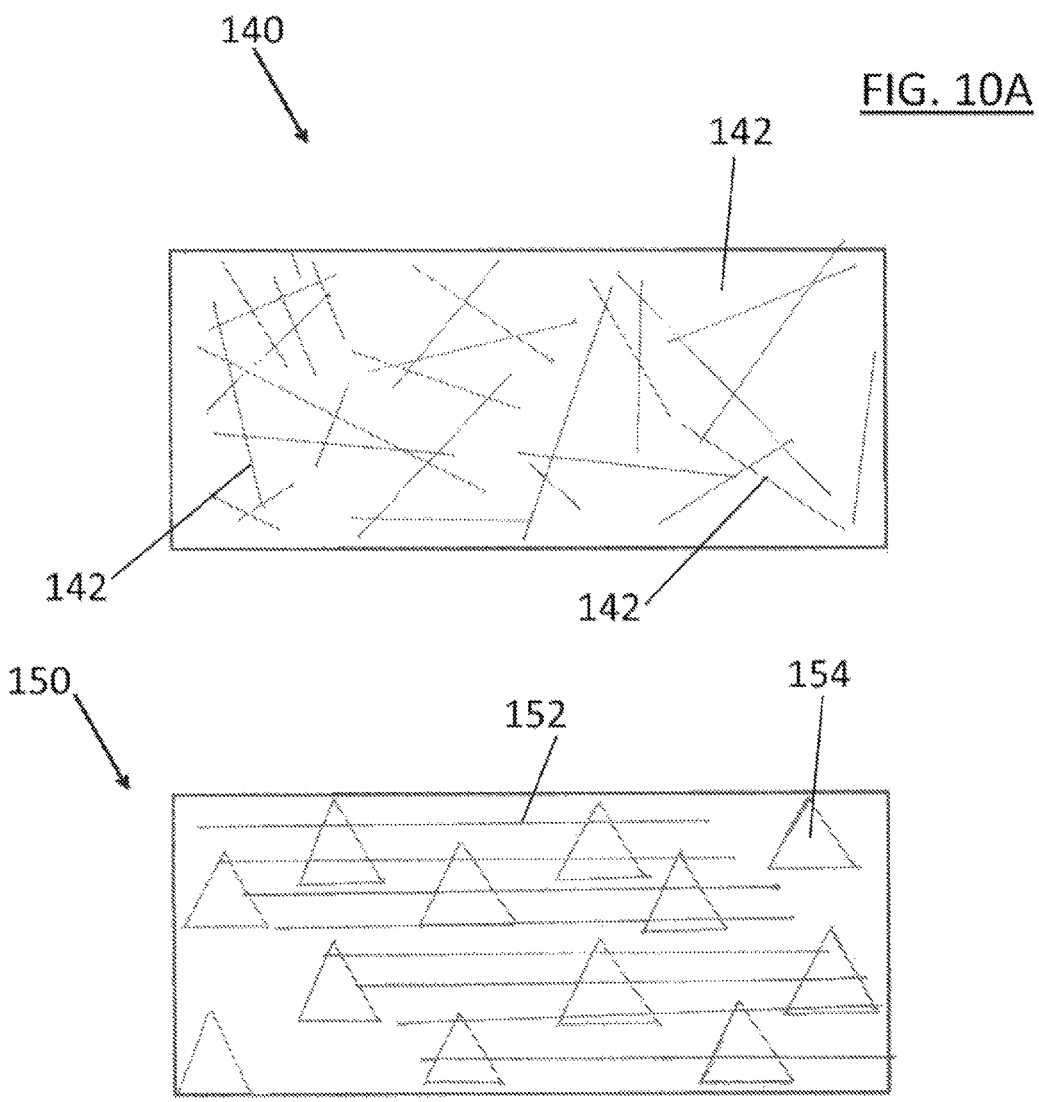

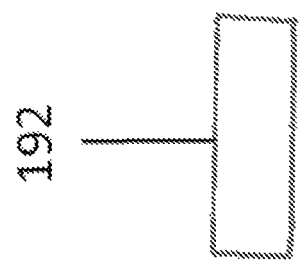

DRY FRICTION DAMPED METALLIC MATERIAL AND METHODS OF MANUFACTURING AND USING SAME

TECHNICAL FIELD

The disclosed inventive concept relates to material having increased damping capacity. More particularly, the disclosed inventive concept relates to a dry friction damped, layered metallic damping material having enhanced vibration damping performance. The damping material has one or more layers of a metallic raw material in a plate form and one or more layers of woven wires in a mesh form. The woven wires are in the form of ropes or cables and may be sheathed or unsheathed. The plural individual wires may be either linear or twisted relative to one another. At least one plate and the at least one mesh of woven wire are subjected to rolling, forming or extruding to form the metallic damping material. The layered metallic material has a broad variety of applications including, without limitation, both automotive and non-automotive products.

BACKGROUND OF THE INVENTION

Undesirable noise and vibration associated with the operation of industrial machinery, automobiles, and household appliances having parts fabricated from metallic materials are significant, recurring, and stubborn sources of customer complaints to the original equipment manufacturers. The volume and expense of required remediation efforts place pressure for improvements on mechanical engineering efforts.

Most known operating machines produce vibration and noise due to the inherent unbalance of their moving parts. Undesirable vibration and noise may also result from the dynamic loading of a structure that either supports an operating machine (or an engine) or carries load while in motion. In circumstances when the natural frequency of vibration of a machine or a structure coincides with the frequency of external excitation, a mechanical or structural engineering system resonant vibration can occur.

Because conventional metallic materials typically used in mechanical and structural engineering have relatively low damping capacity, a system resonance can lead not only to the objectionable levels of noise and vibration levels but may even result in a total system failure due to the material fatigue that results from the cyclic variation of the induced stress. Accordingly, it is desired to increase the damping capacity of a metallic material in order to suppress undesirable resonant vibration, thereby preventing the undesirable noise and vibration levels or even a total system failure due to the material fatigue.

In view of the state of the art, it may be advantageous to provide new metallic materials that demonstrate improvement in vibration damping by embedding in the metallic material a wire rope or wire ropes during a rolling, forming or extruding operation that utilizes benefits of inter-wire friction for preventing undesirable noise and vibration in operation of industrial machinery, automobiles, and household appliances that have parts fabricated of metallic materials.

As in so many areas of manufacturing technology, there is always room for improvement related to undesirable noise and vibration associated with metallic materials conventionally used in a wide array of mechanical and structural components.

SUMMARY OF THE INVENTION

The disclosed inventive concept provides a method and system for forming a metallic material with enhanced vibration damping performance may include one or a plurality of layers of a metallic raw material in plate form and one or a plurality of bundles of woven wires (wire ropes or cables) that are arranged, for example, in a mesh form which are superposed vertically and then subjected to rolling, forming or extruding. The rolling, forming or extruding process parameters can be optimized to achieve the proper embedding of the cables into the metal plate thereby locking the cables firmly into the metal plate with the metal material flowing over the cable outer surfaces without infiltrating between the individual wires. The improvement of bonding quality between the cable outer surfaces and the metallic material can be achieved by using soldering or brazing process.

The woven mesh layer comprises a plurality of sheathed or unsheathed wire ropes with each rope comprising one or more wires. The individual wire ropes are woven to form the mesh layer with some ropes being positioned in a first or Y direction and the other ropes being positioned in a second or X direction. If sheathed, the sheathing is formed from a thin layer of metal.

The increase in damping performance of the resulting material is due to the dry inter-wire friction within the embedded cables which develops between the surfaces of individual wires upon dynamic loading of a structure utilizing the new material. Particularly, the individual wires of the metal ropes can have an arbitrary cross section though a circular cross section is a preferred option due to a lower cost and availability while the individual ropes demonstrate a tensile strength of 201 MPa or higher.

Other possible examples of uniform layouts for metal ropes according to the disclosed inventive concept include but are not limited to layouts where individual wires of at least one metal rope or of at least one bundle of woven metal ropes are arranged in an entangled or random, the individual ropes and rope bundles are combined in a mesh form or in an entangled form, the metal ropes are in the form of fibers of various length in a random or in a specific pattern orientation, and a combination of such layouts. In addition, wire ropes that are either in continuous form or in a discontinuous form (such as fibers) as well as in a combination of these forms can be arraigned to create uniformly or non-uniformly distributed desired custom markings having a predetermined size and shape, for example, as a company logo or trademark.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein:

FIG. 6 is a perspective view of an exemplary component that includes the layered metallic damping material according to the disclosed inventive concept;

FIG. 10A is an example of metal ropes in the form of fibers having various lengths in a random orientation according to the disclosed inventive concept;

FIG. 10B is an example of metal ropes in the form of fibers having various lengths in a specific pattern orientation according to the disclosed inventive concept;

FIG. 12G is cross section of an individual wire of the metal rope of the disclosed inventive concept having the shape of a rectangle.

DETAILED DESCRIPTION OF THE PREFERRED EMBODIMENT

Figure 1:
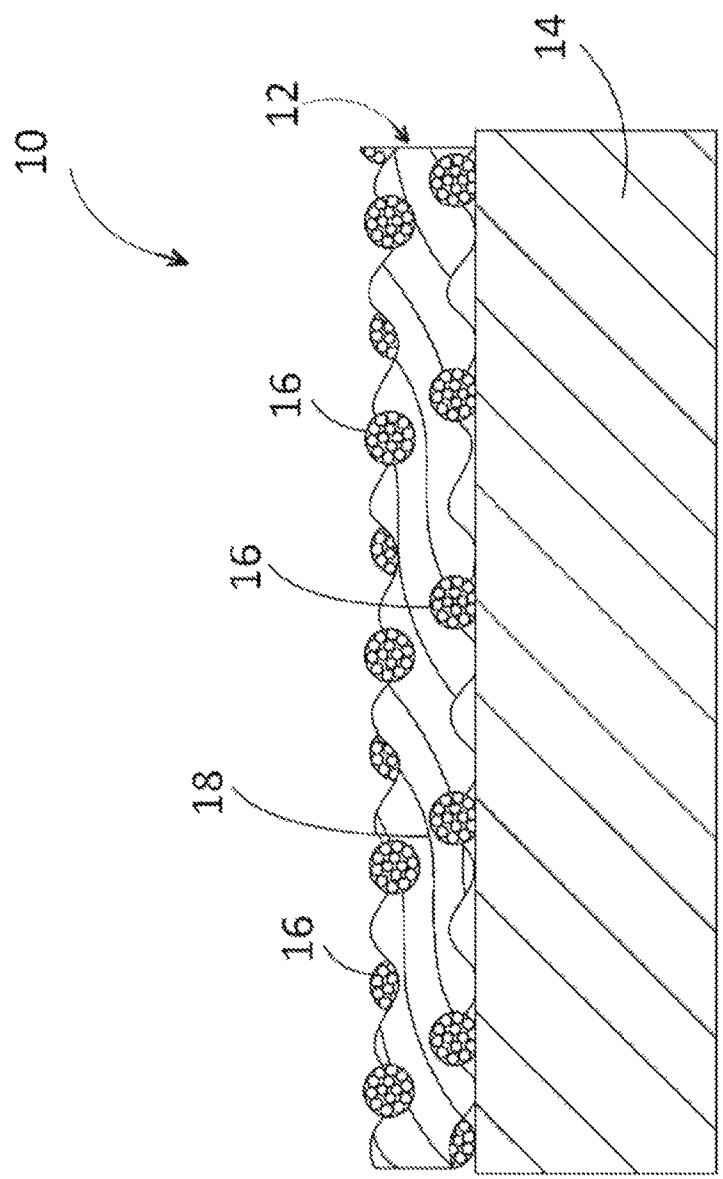
FIG. 1 is a sectional illustration of a portion of a layered metallic damping material according to one embodiment of the disclosed inventive concept illustrating an upper layer of wire mesh and a lower metal plate.

In the following figures, the same reference numerals will be used to refer to the same components. In the following description, various operating parameters and components are described for different constructed embodiments. These specific parameters and components are included as examples and are not meant to be limiting.

The disclosed inventive concept is illustrated in the accompanying figures in which alternative embodiments are shown, including a dry friction damped, layered metallic damping material having a metal plate with a single layer of unsheathed woven wire mesh, a metal plate between two layers of unsheathed woven wire, a metal plate with a single layer of sheathed woven wire mesh, and a possible application of the layered metallic damping material. It is to be understood that other variations of the disclosed inventive concept are possible, including without limitation a layered metallic damping material having a combination of sheathed and unsheathed woven wire mesh layers.

Referring to FIG. 1, a portion of a dry friction damped, layered metallic damping material according to an embodiment of the disclosed inventive concept is generally illustrated as 10. The layered metallic damping material 10 includes an upper layer defined by a bundled wire mesh 12 and a lower layer of a raw metallic material 14. The raw metallic material 14 may be any of several metal materials suitable for the particular application.

The bundled wire mesh 12 includes a plurality of individual wires bundled together to form an array of wire ropes 16 that run in a first direction X and an array of wire ropes 18 that run in a second direction Y, of which a single wire rope 18 is illustrated. It is to be understood that the array of wire ropes 16 and the array of wire ropes 18 may be single wires or may be bundles of single wires as illustrated.

The length and diameter of the wires used in the disclosed inventive concept as illustrated in FIG. 1 and in the other figures are only suggestive and are not intended as being limiting. Similarly, the number, diameter, and internal configuration of the wires as illustrated are also only suggestive. The individual wires that form the rope may be configured in a linear or helical manner. The wires in FIG. 1 are arrayed in a helical manner.

A greater or lesser number of wires may be incorporated. By adjusting the length and diameter of the individual vibration-damping rope and by adjusting the number, diameter, and internal configuration of the wires, the damping characteristics according to the disclosed inventive concept may be virtually infinitely tuned for a broad variety of applications. The wires are preferably made of steel although other metals may be selected for this use. The wires rope may be made of the same metal or of different metals.

Figure 2:
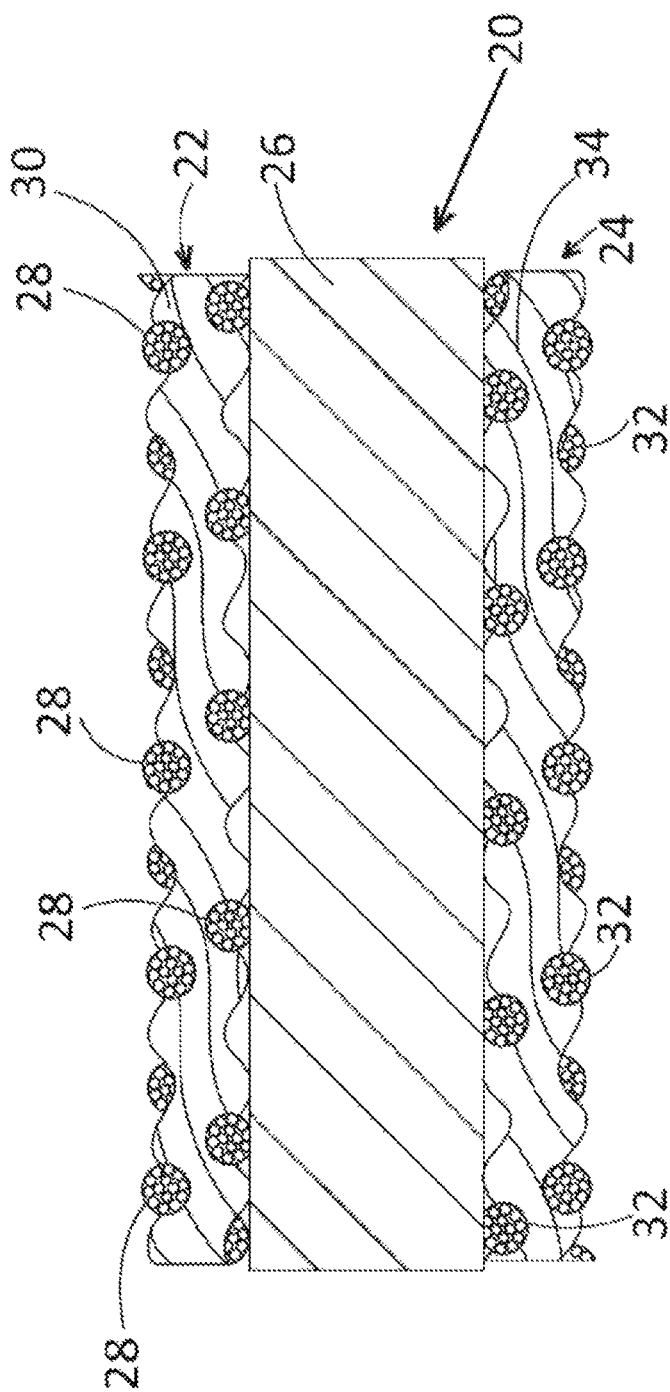
FIG. 2 is a sectional illustration of a portion of a layered metallic material according to another embodiment of the disclosed inventive concept illustrating upper and lower layers of wire mesh and a lower metal plate.

Referring to FIG. 2, a portion of a layered metallic damping material according to an additional embodiment of the disclosed inventive concept is generally illustrated as 20. The layered metallic damping material 20 includes an upper layer defined by an upper bundled wire mesh 22, a lower layer defined by a lower bundled wire mesh 24, and an intermediate layer of raw metallic material 26. Like the raw metallic material 14 discussed above in relation to FIG. 1, the raw metallic material 26 may be any of several metal materials suitable for the particular application.

The upper bundled wire mesh 22 includes a plurality of individual wires bundled together to form an array of wire ropes 28 that run in a first direction X and an array of wire ropes 30 that run in a second direction Y, of which a single wire rope 30 is illustrated. The upper bundled wire mesh 24 includes a plurality of individual wires bundled together to form an array of wire ropes 32 that run in a first direction X and an array of wire ropes 34 that run in a second direction Y, of which a single wire rope 34 is illustrated. It is to be understood that the array of wire ropes 28, 30, 32 and 34 may be comprised of single wires or may be bundles of single wires.

Figure 3:
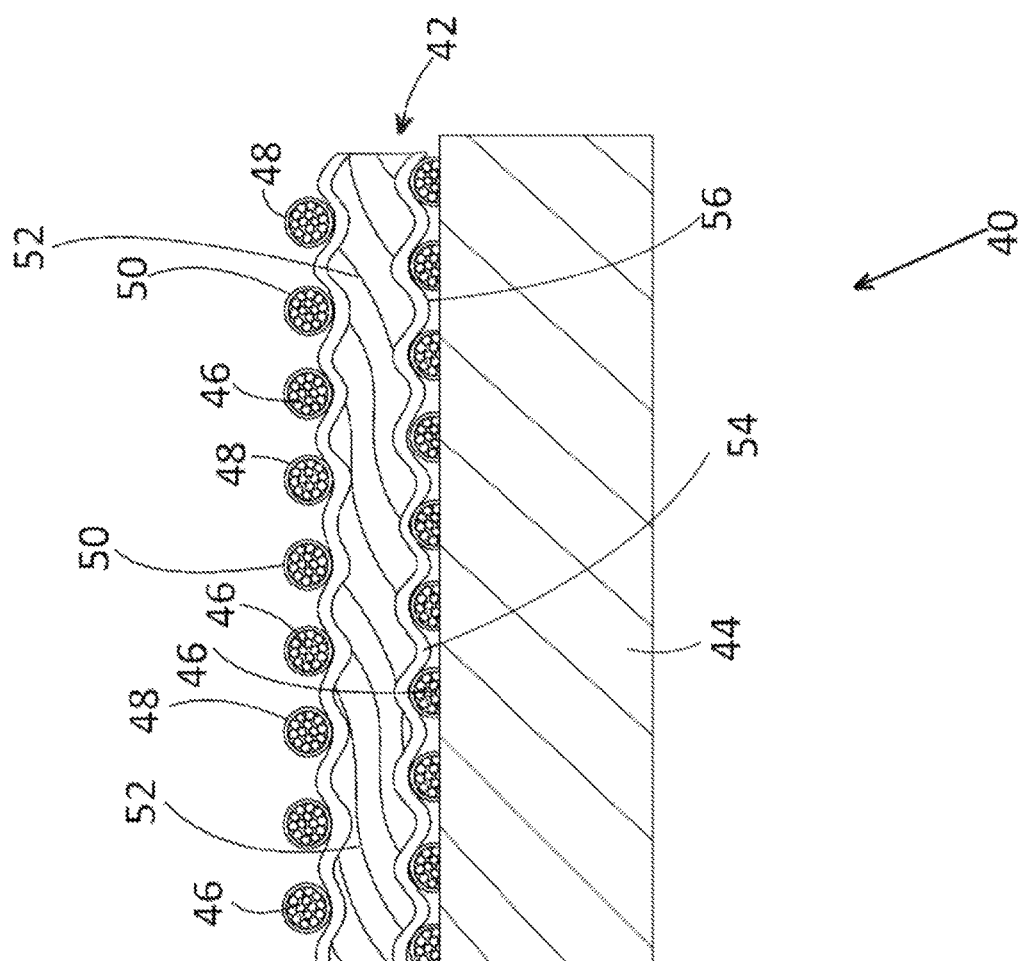
FIG. 3 is a sectional illustration of a portion of a layered metallic material according to a further embodiment of the disclosed inventive concept similar to the layered metallic material of the embodiment illustrated in FIG. 1 but showing sheathed wires of the wire mesh layer.

Referring to FIG. 3, a portion of a layered metallic damping material according to a further embodiment of the disclosed inventive concept is generally illustrated as 40. The layered metallic damping material 40 includes an upper layer defined by a bundled wire mesh 42 and a lower layer of a raw metallic material 44. The raw metallic material 44 may be any of several metal materials suitable for the particular application.

To ensure that the wires are free to move and increase damping capacity, the individual wires may be collectively wrapped in a thin metal sheath that fully encompasses all of the wires. Accordingly, the bundled wire mesh 42 includes a plurality of individual wires 46 wrapped in thin metal sheathes 48 to form an array of sheathed wire ropes 50 that run in a first direction X and a plurality of individual wires 52 wrapped in thin metal sheathes 54 to form an array of wire ropes 56 that run in a second direction Y. Each sheath may be formed from the same material as the wires or may be a different material.

The wire spatial distribution may have a specific pattern to increase damping capacity most in the areas of the resulting material that could have highest vibration amplitudes upon the usage. Correspondingly, the thin metal sheath can be used to cover only some portions of the individual cables in the metallic material areas where the damping enhancement is needed.

Figure 4:
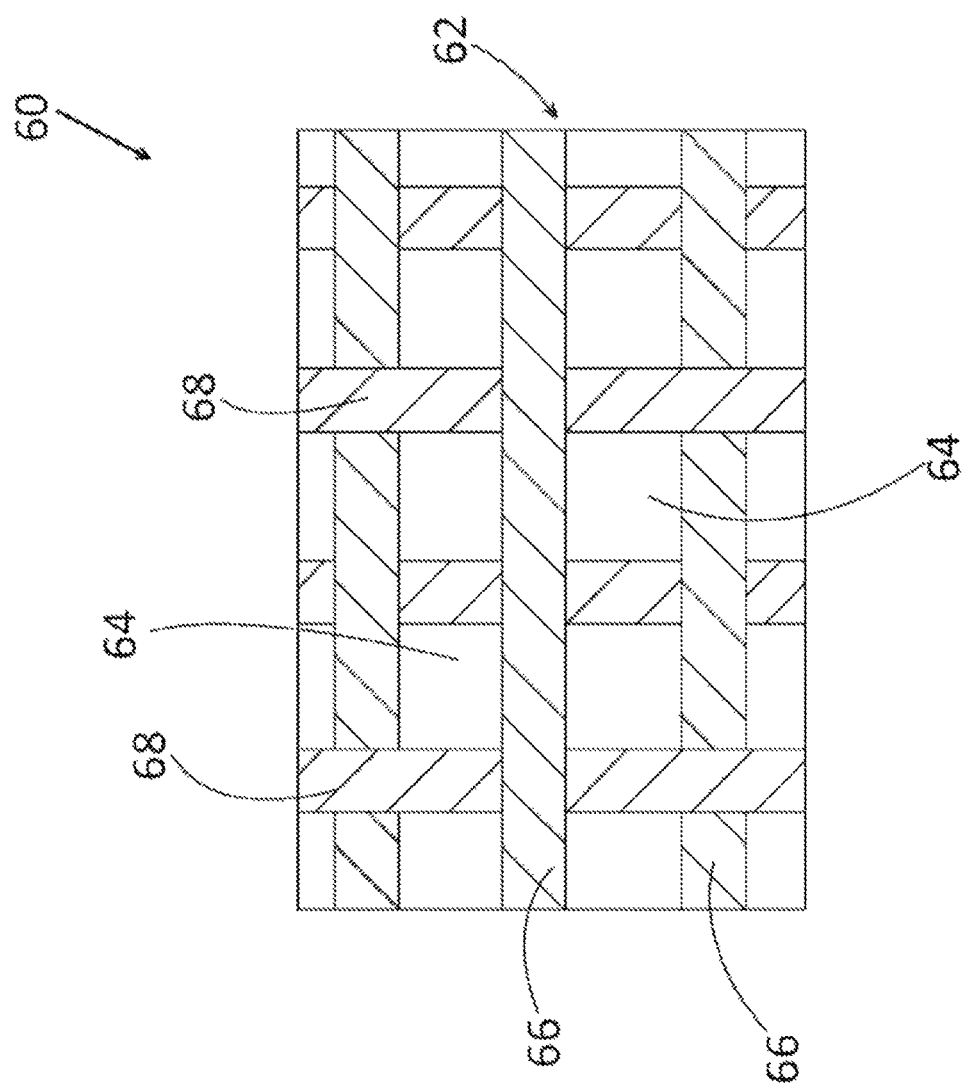
FIG. 4 is a top view of a wire mesh layer illustrated in section according to one embodiment of the disclosed inventive concept.
Figure 5:
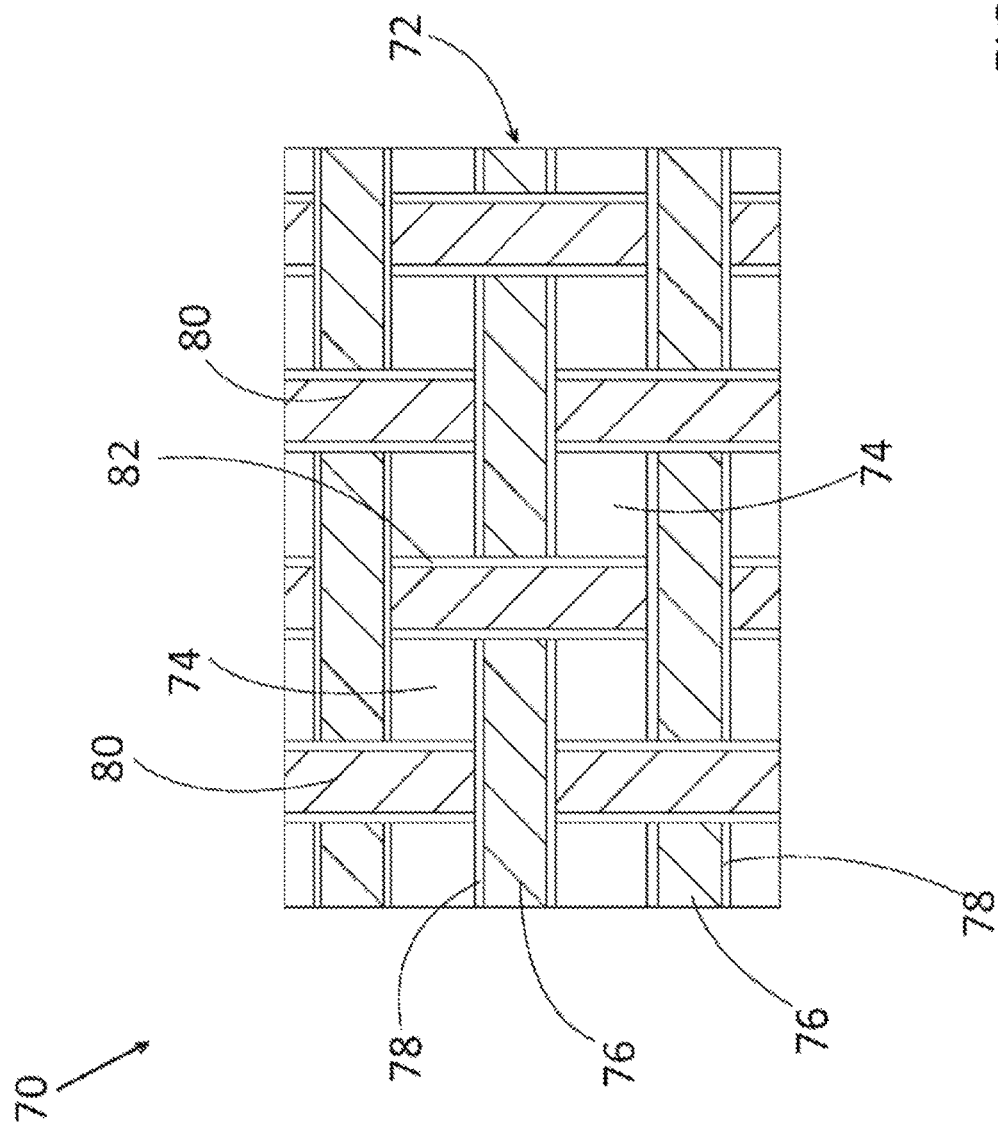
FIG. 5 is a top view of a wire mesh layer illustrated in section according to another embodiment of the disclosed inventive concept which is similar to the embodiment illustrated in FIG. 4 but showing sheathed wires.

Two embodiments of the layered metallic damping material of the disclosed inventive concept are illustrated from top views in FIGS. 4 and 5. Referring to FIG. 4, one embodiment of a layered metallic damping material, generally illustrated as 60, is shown viewed from the top. The layered metallic damping material 60 includes an unsheathed wire mesh 62 shown in sectional view formed over a raw metallic material 64. The raw metallic material 64 may be any of several metal materials suitable for the particular application.

The unsheathed bundled wire mesh 62 includes a plurality of individual wires bundled together to form an array of wire ropes 66 that run in a first direction X and an array of wires bundled together to form an array of wire ropes 68 that run in a second direction Y. It is to be understood that the array of wire ropes 66 and the array of wire ropes 68 may be comprised of single wires or may be bundles of single wires. In addition, the density of the array of wire ropes 66 and 68 may be greater or lesser than that illustrated.

A further embodiment of the layered metallic damping material disclosed inventive concept is illustrated in FIG. 5 in which a layered metallic damping material, generally illustrated as 70, is shown viewed from the top. The layered metallic damping material 70 includes a sheathed wire mesh 72 shown in sectional view formed over a raw metallic material 74. Like the raw metallic material 64 of the embodiment illustrated in FIG. 4, the raw metallic material 74 may be any of several metal materials suitable for the particular application.

The sheathed bundled wire mesh 72 includes a plurality of individual wires bundled together to form an array of wire ropes 76 that run in a first direction X. Each of the wire ropes 76 includes a sheathing 78. The sheathed bundled wire mesh 72 further includes an array of wire ropes 80 that run in a second direction Y. Each of the wire ropes 80 includes a sheathing 82. It is to be understood that the array of sheathed wire ropes 76 and the array of sheathed wire ropes 89 may be comprised of single wires or may be bundles of single wires. In addition, the density of the array of wire ropes 76 and 80 may be greater or lesser than that illustrated.

As mentioned previously, dry friction damped, layered metallic damping material of the disclosed inventive concept may be used in a broad variety of applications, including both automotive and non-automotive. Without limitation, automotive applications include body panels and structures as well as stamped suspension components. Particular components include body structure subsystems, body dashes and cowls, body sides and quarters, front end subsystems, front structures, front side doors, front suspension subsystems, front suspension members, front hubs and spindles as well as knuckles, rear suspension subsystems, and rear suspension members One such component, a shock absorber tower, is shown in perspective view in FIG. 6, and is generally illustrated as 90. The shock absorber tower 90 includes a body 92 and a shock absorber stud port 94.

A portion of a dry fiction, layered metallic damping material 96 is illustrated beneath and adjacent to a metal layer 98. It is to be understood that the damping material may be formed under the entire metal layer 98 forming the shock absorber tower 90 or may be strategically disposed under only a portion of the shock absorber tower 90. It is also understood that the damping material 96 may be sandwiched between the metal layer 98 and a lower metal layer (not shown) as desired. Thus the construction of the embodiment of the disclosed inventive concept illustrated in FIG. 6 is an example of how selective use of the dry friction damped, layered metallic damping material 96 may be tuned for maximum damping in response to a given application.

To form an object incorporating the dry friction damped, layered metallic damping material of the disclosed inventive concept, individual wire ropes are prepared, either sheathed or unsheathed depending on the preferred application. The wire ropes are then woven together to form a mesh layer. One or more mesh layers are then attached to a solid metal layer by rolling, forming or extruding.

The increase in damping performance of the resulting material is due to the dry inter-wire friction within the embedded cables which develops between the surfaces of individual wires upon dynamic loading of a structure utilizing the new material. To ensure the sufficient material strength as required for a specific usage, the rolling, forming or extruding process parameters can be optimized to achieve the proper embedding of the cables into the metal plate where the cables are locked firmly into the metal plate with the metal material flowing over the cable outer surfaces without infiltrating between the individual wires. The improvement of bonding quality between the cable outer surfaces and the metallic material can be achieved by using soldering or brazing process. For example, the cables in the metallic material can be coated with a soft soldering material then placed on a metal plate and subjected to at least one rolling, forming or extruding operation for locating and embedding into the metal plate. After that, the embedded cable surface of the metal plate is coated with a suitable flux and the surface is heated until melting of the solder coating.

As noted above, other possible examples of uniform layouts for metal ropes according to the disclosed inventive concept may be envisioned. Such alternatives include but are not limited to layouts where individual wires of at least one metal rope or of at least one bundle of woven metal ropes are arranged in an entangled or random, the individual ropes and rope bundles are combined in a mesh form or in an entangled form, the metal ropes are in the form of fibers of various length in a random or in a specific pattern orientation, and a combination of such layouts.

Figure 7A:
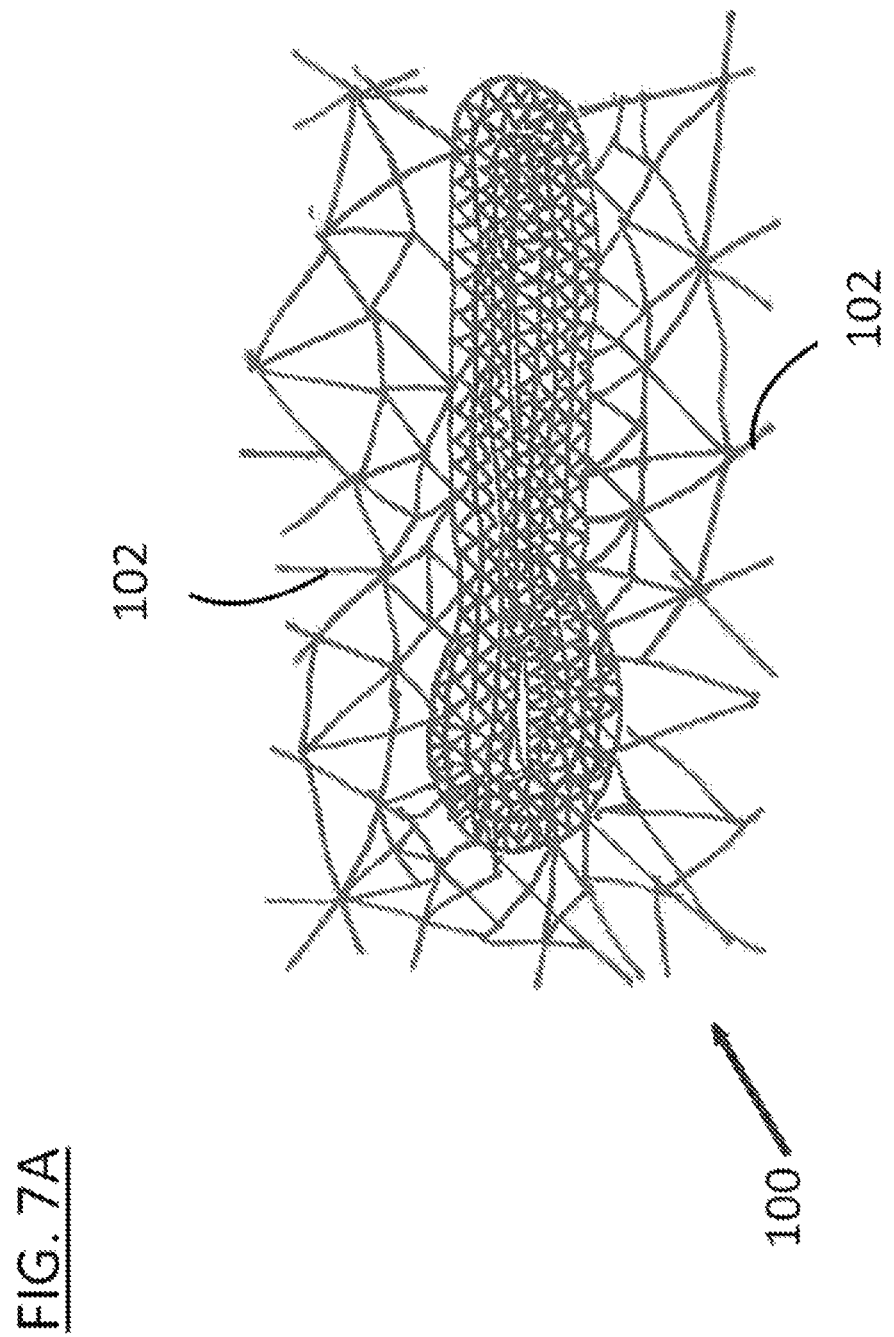
FIG. 7A is an example of a non-uniform layout for bundled wires according to the disclosed inventive concept.

Referring to FIG. 7A, an example of a non-uniform layout for bundled wires is illustrated as 100. The non-uniform layout for bundled wires 100 includes a plurality of individual wires 102.

Figure 7B:
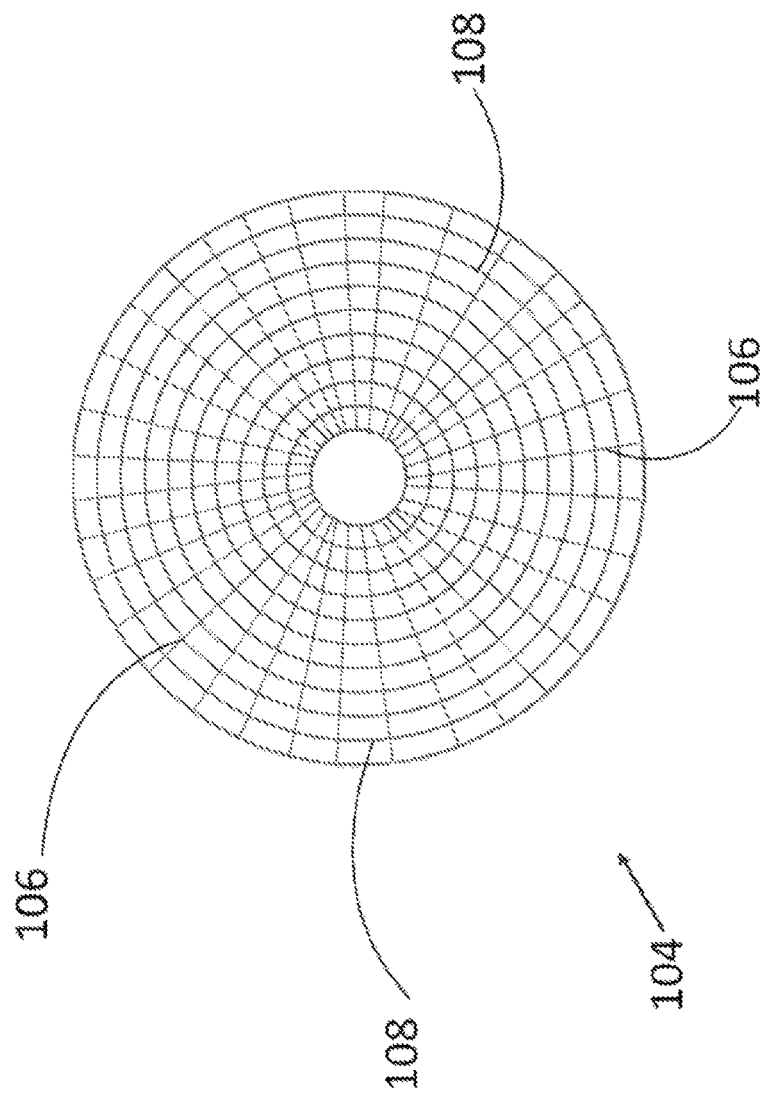
FIG. 7B is an example of a uniform layout for bundled wires according to the disclosed inventive concept.

Referring to FIG. 7B, an example of a uniform layout for bundled wires is illustrated as 104. The uniform layout for bundled wires 104 includes a plurality of radial wires 106 intersecting a plurality of concentric wire rings 108.

Figure 8A:
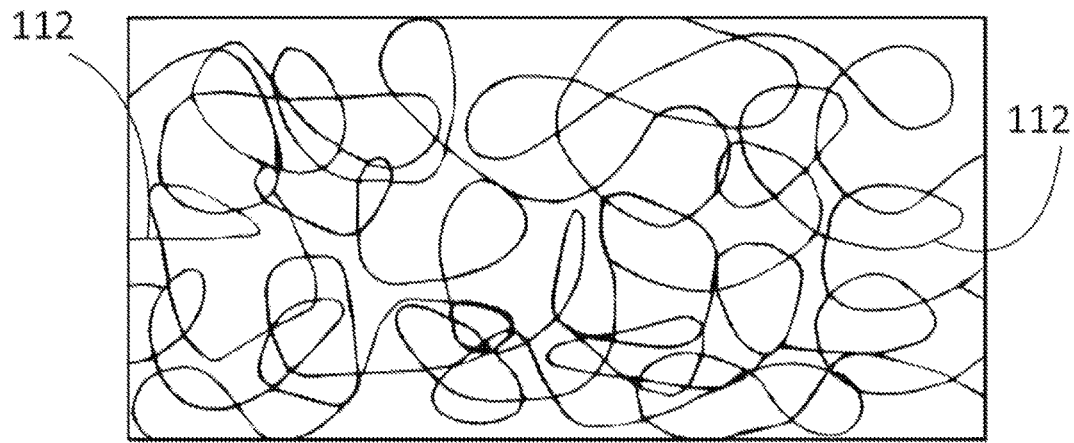
FIG. 8A is an example of individual wires of at least one metal rope or a bundle of woven metal ropes arranged in an entangled form according to the disclosed inventive concept.
Figure 8B:
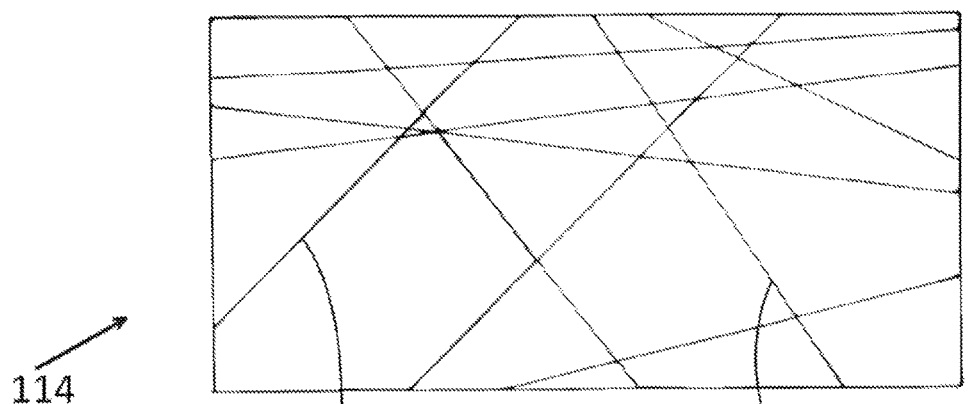
FIG. 8B is an example of individual wires of at least one metal rope or a bundle of woven metal ropes arranged in a random form according to the disclosed inventive concept.

An example of individual wires of a metal rope or of a bundle of woven metal ropes is illustrated in FIG. 8A in an entangled form, generally illustrated as 110. The entangled bundle of woven or metal ropes 110 includes a plurality of individual wires 112.

An example of individual wires of at least one metal rope or of at least one bundle of woven metal ropes is illustrated in FIG. 8A in a random form, generally illustrated as 114. The random bundle of woven or metal ropes 114 includes a plurality of individual and substantially straight wires 116.

Figure 9A:
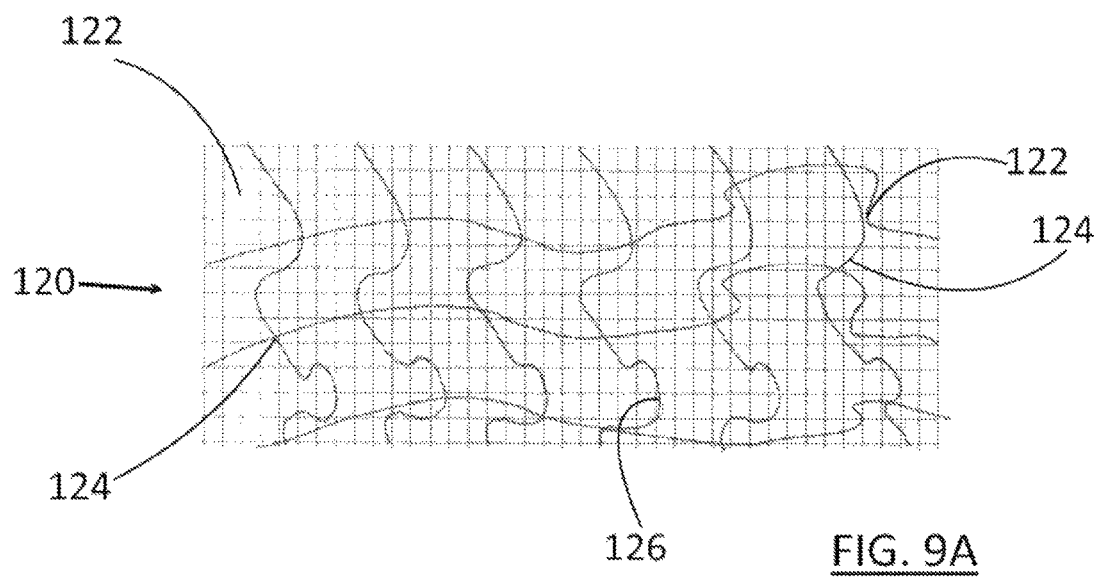
FIG. 9A is an example of individual ropes and rope bundles combined in a mesh form according to the disclosed inventive concept.
Figure 9B:
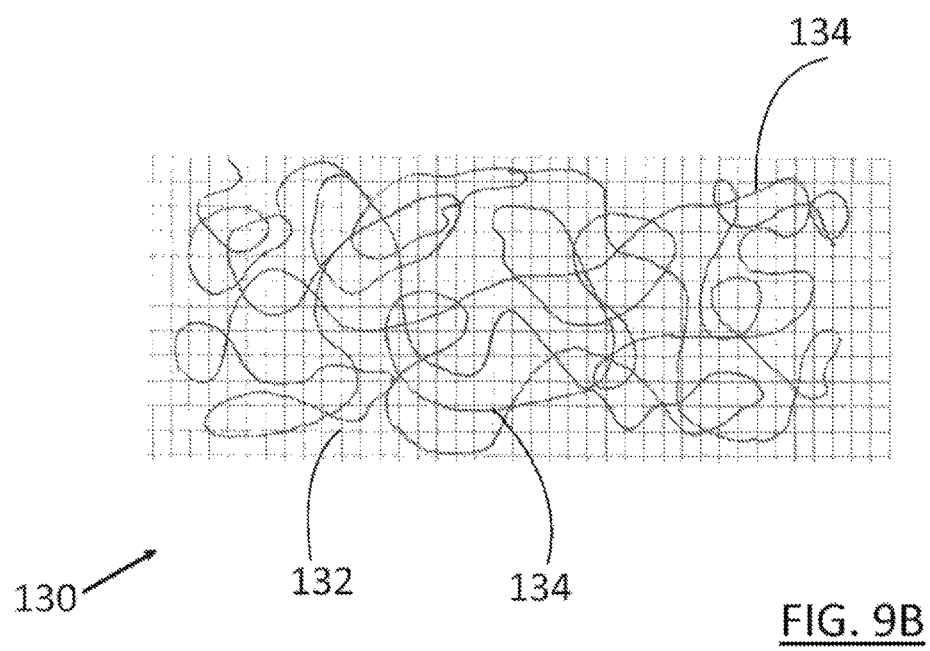
FIG. 9B is an example of individual ropes and rope bundles combined in an entangled form according to the disclosed inventive concept.

FIGS. 9A and 9B illustrate non-linear wires combined with a wire mesh described above and shown particularly in FIGS. 4 and 5. Particularly, and referring to FIG. 9A, a wire and mesh combination, generally illustrated as 120, includes a wire mesh base 122 (comprising wires in the X and Y directions) having intersecting, non-linear wires 124 and 126 formed as an overlaying patterned mesh. Referring to FIG. 9B, a wire and mesh combination, generally illustrated as 130, includes a wire mesh base 132 (also comprising wires in the X and Y directions) having individual ropes and rope bundles 134 formed as an overlaying, entangled array of wires.

As illustrated in FIGS. 10A and 10B, the metal ropes may be provided in the form of reinforcing fibers having different lengths. Referring to FIG. 10A, an array 140 of metal ropes 142 having different lengths is illustrated in a random orientation. Referring to FIG. 10B, an array 150 of metal ropes 152 having different lengths is illustrated aligned in a specific pattern relative to background structures 154.

Figures 11A, 11B:
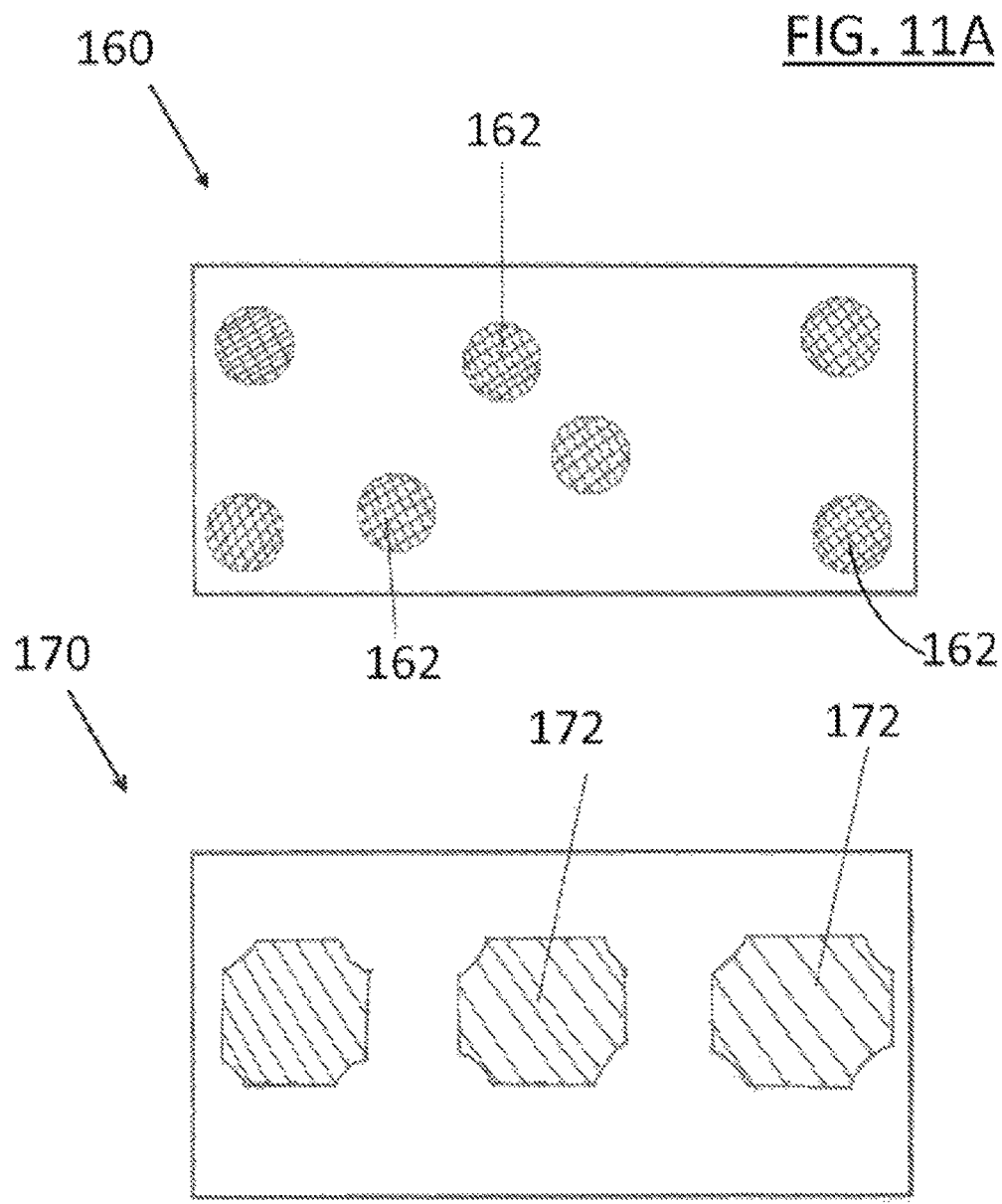
FIG. 11A is an example of non-uniformly distributed custom markings having predetermined sizes and shapes.
FIG. 11B is an example of uniformly distributed custom markings having predetermined sizes and shapes.

As also noted above, wire ropes that are either in continuous form or in a discontinuous form (such as fibers) as well as in a combination of these forms can be arranged to create uniformly or non-uniformly distributed desired custom markings having a predetermined size and shape. In FIG. 11A, an array 160 of custom formed mesh markings 162 are illustrated in a non-uniform arrangement. In FIG. 11B, an array 170 of custom formed mesh markings 162 are illustrated in a uniform arrangement. In addition to providing a metallic material having enhanced vibration damping performance, the custom markings illustrated in FIGS. 11A and 11B may find application in such specific uses as corporate trademarks and logos.

Figure 12C:
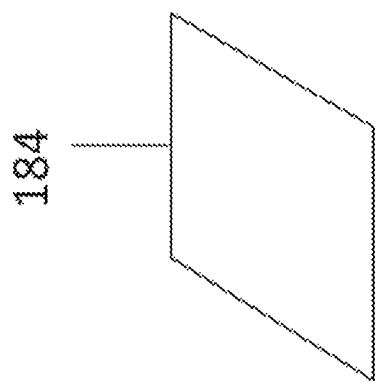
FIG. 12C is cross section of an individual wire of the metal rope of the disclosed inventive concept having the shape of a parallelogram.
Figure 12B:
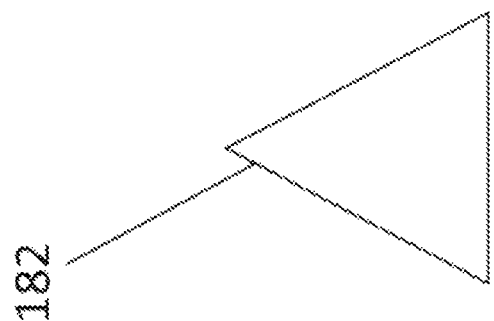
FIG. 12B is cross section of an individual wire of the metal rope of the disclosed inventive concept having the shape of a triangle.
Figure 12A:
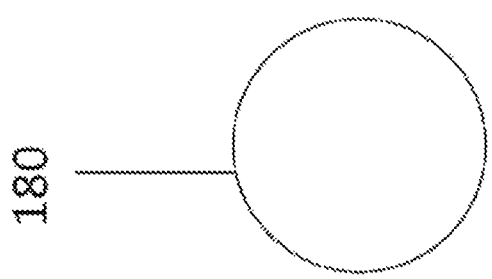
FIG. 12A is cross section of an individual wire of the metal rope of the disclosed inventive concept having the shape of a circle.
Figure 12F:
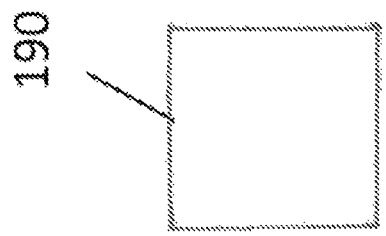
FIG. 12F is cross section of an individual wire of the metal rope of the disclosed inventive concept having the shape of a square.
Figure 12E:
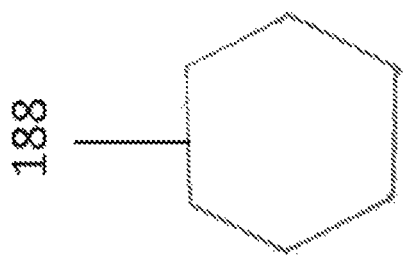
FIG. 12E is cross section of an individual wire of the metal rope of the disclosed inventive concept having the shape of a hexagon.
Figure 12D:
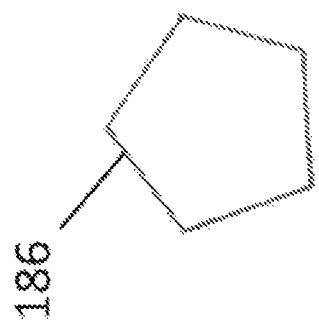
FIG. 12D is cross section of an individual wire of the metal rope of the disclosed inventive concept having the shape of a pentagon.

FIGS. 12A through 12G illustrate possible cross sections of the individual wires used alone or in combination in the mesh ropes of the disclosed inventive concept. Such examples of possible cross sections include a wire 180 having the shape of a circle as shown in FIG. 12A, a wire 182 having the shape of a triangle as shown in FIG. 12B, a wire 184 having the shape of a parallelogram as shown in FIG. 12C, a wire 186 having the shape of a pentagon as shown in FIG. 12D, a wire 188 having the shape of a hexagon as shown in FIG. 12E, a wire 190 having the shape of a square as shown in FIG. 12F, and a wire 192 having the shape of a rectangle as shown in FIG. 12G. Other shapes or a combination of shapes for the wires that form the ropes of the disclosed inventive concept are possible.

One skilled in the art will readily recognize from such discussion, and from the accompanying drawings and claims that various changes, modifications and variations can be made therein without departing from the true spirit and fair scope of the invention as defined by the following claims.

What is claimed is:

1. A dry friction damped material for use in an article, the material comprising:
    a metallic substrate having first and second sides; and
    a woven mesh at least partially embedded in said first side of said substrate, said woven mesh comprising an array of interwoven longitudinal and transverse ropes having outer surfaces, said ropes formed from a plurality of bundled wires,
    wherein said ropes are firmly locked in said substrate with said substrate flowing over said outer surfaces of said ropes without infiltrating in between said bundled wires of each of said ropes, and
    wherein sliding movement of the surfaces of the wires relative to one another dampens resonant vibration of the article.

2. The dry friction damped material for use in an article of claim 1 wherein each of said ropes is encased within single layer of outer metal sheathing.

3. The dry friction damped material for use in an article of claim 1 further including a second woven mesh attached to said second side of said substrate.

4. The dry friction damped material for use in an article of claim 3 wherein said second woven mesh is attached to said second side of said substrate by at least partially embedding said second woven mesh in said second side of said substrate.

5. The dry friction damped material for use in an article of claim 1 wherein said bundled wires are arranged linearly or helically.

6. A dry friction damped material for use in an article, the material comprising:
    a metallic substrate having first and second sides;
    a woven mesh at least partially embedded in said first side of said substrate, said woven mesh comprising an array of metallic longitudinal ropes interwoven with an array of metallic transverse ropes having outer surfaces, at least one of said ropes formed from a plurality of bundled wires and encased within a single layer of outer metal sheathing,
    wherein said ropes are firmly locked in said substrate with said substrate flowing over said outer surfaces of said ropes without infiltrating said sheathing, and
    wherein sliding movement of the surfaces of the wires relative to one another or to the inner surfaces of said sheathing dampens resonant vibration of the article.

7. The dry friction damped material for use in an article of claim 6 wherein at least one of said ropes includes a single wire.

8. The dry friction damped material for use in an article of claim 6 wherein each of said ropes includes a plurality of bundled wires.

9. The dry friction damped material for use in an article of claim 6 wherein said plurality of wires is arranged linearly or helically.

10. The dry friction damped material for use in an article of claim 6 wherein each of said ropes is encased within an outer sheathing.

11. The dry friction damped material for use in an article of claim 6 further including a second woven mesh attached to said second side of said substrate.

12. The dry friction damped material for use in an article of claim 11 wherein said second woven mesh is attached to said second side of said substrate by at least partially embedding said second woven mesh in said second side of said substrate.

13. A method for forming a dry friction damped material for use in an article, the method comprising:
   forming a metal substrate having first and second sides;
   forming a plurality of ropes having outer surfaces, each rope comprising a plurality of bundled wires;
   encasing at least one of said ropes within a single layer of outer metal sheathing;
   interweaving said ropes in longitudinal and transverse directions to form an interwoven mesh layer; and
   at least partially embedding said mesh layer on said first side of said substrate to firmly lock said ropes in said substrate with said substrate flowing over said outer surfaces of said ropes without infiltrating in between said bundled wires,
   wherein sliding movement of the surfaces of the wires relative to one another dampens resonant vibration of the article.

14. The method for forming a dry friction damped material for use in an article of claim 13 including encasing each of said plurality of wires in an outer metal sheathing to form sheathed ropes.

15. The method for forming a dry friction damped material for use in an article of claim 13 wherein said interwoven mesh layer is a first layer and the method further including interweaving said ropes in longitudinal and transverse directions to form a second interwoven mesh layer and at least partially embedding said second woven mesh layer on said second side of said substrate.

16. The method for forming a dry friction damped material for use in an article of claim 13 including attaching said woven mesh layer to said substrate by a method selected from the group consisting of rolling, forming and extruding.

17. The method for forming a dry friction damped material for use in an article of claim 13 including the further step of bonding an outer surface of said woven mesh layer to said substrate by a method selected from the group consisting of soldering and brazing.

18. The method for forming a dry friction damped material for use in an article of claim 13 including the step of coating said ropes with a soldering material without infiltrating inside said ropes before embedding said ropes into said substrate.

* * * * *